(12) United States Patent
Uusimaa et al.

(10) Patent No.: US 12,449,360 B2
(45) Date of Patent: Oct. 21, 2025

(54) APPARATUS AND METHOD FOR FLUORESCENCE EXCITATION AND DETECTION

(71) Applicant: MODULIGHT CORPORATION, Tampere (FI)

(72) Inventors: Petteri Uusimaa, Tampere (FI); Elias Kokko, Tampere (FI); Lasse Orsila, Tampere (FI); Matius Hurskainen, Tampere (FI)

(73) Assignee: MODULIGHT CORPORATION, Tampere (FI)

( * ) Notice: Subject to any disclaimer, the term of this patent is extended or adjusted under 35 U.S.C. 154(b) by 100 days.

(21) Appl. No.: 17/573,404

(22) Filed: Jan. 11, 2022

(65) Prior Publication Data
US 2023/0221251 A1    Jul. 13, 2023

(51) Int. Cl.
*G01N 21/64* (2006.01)
(52) U.S. Cl.
CPC ..... *G01N 21/6428* (2013.01); *G01N 21/6486* (2013.01); *G01N 2021/6439* (2013.01)
(58) Field of Classification Search
None
See application file for complete search history.

(56) References Cited

U.S. PATENT DOCUMENTS

| | | | | |
|---|---|---|---|---|
| 5,760,900 A | * | 6/1998 | Ito | G01N 15/1434 356/73 |
| 6,067,157 A | * | 5/2000 | Altendorf | G01N 15/147 356/337 |
| 8,373,860 B2 | * | 2/2013 | Kiesel | G01N 21/255 356/417 |
| 8,723,140 B2 | * | 5/2014 | Kiesel | G01N 21/6408 250/458.1 |

(Continued)

FOREIGN PATENT DOCUMENTS

| | | |
|---|---|---|
| CN | 111141713 A | 5/2020 |
| CN | 111380848 A | 7/2020 |
| WO | WO 2021/183967 A1 | 9/2021 |

OTHER PUBLICATIONS

International Search Report for International Patent Application No. PCT/FI2023/050025, mailed on Apr. 14, 2023, 4 pages.

(Continued)

*Primary Examiner* — David P Porta
*Assistant Examiner* — Djura Malevic
(74) *Attorney, Agent, or Firm* — Alston & Bird LLP (57) ABSTRACT

Disclosed is an apparatus and method for fluorescence excitation and detection. The apparatus comprises one or more light sources for providing excitation light for fluorescence excitation at an observation spot along an optical axis for excitation, an optical collection element for collecting fluorescence light generated by the excitation light at two or more different observation spots into two or more different measurement channels with an optical axis for (Continued)

collecting non-parallel to the optical axis for excitation of each of the one or more light sources, and, for each of the two or more measurement channels and thereby for each of the two or more observation spots, a dedicated optical detector for detecting fluorescence from the fluorescence light collected by the optical collection element.

16 Claims, 4 Drawing Sheets

(56) References Cited

U.S. PATENT DOCUMENTS

| | | | | |
|---|---|---|---|---|
| 9,029,800 | B2* | 5/2015 | Kiesel | G01N 15/1459 |
| | | | | 250/458.1 |
| 9,273,949 | B2* | 3/2016 | Bornhop | G01N 21/45 |
| 9,797,836 | B1* | 10/2017 | Sinclair | G01N 15/147 |
| 10,371,622 | B2* | 8/2019 | Sharpe | B01L 3/502761 |
| 11,123,137 | B2* | 9/2021 | Uusimaa | A61N 5/06 |
| 11,169,084 | B2* | 11/2021 | Marshall | G01N 21/274 |
| 11,490,961 | B2* | 11/2022 | Vilokkinen | A61B 5/0059 |
| 2002/0102595 | A1* | 8/2002 | Davis | C12Q 1/6869 |
| | | | | 435/6.12 |
| 2009/0195773 | A1* | 8/2009 | Bassler | G01N 21/05 |
| | | | | 356/73 |
| 2010/0201988 | A1* | 8/2010 | Kiesel | G01N 21/05 |
| | | | | 250/573 |
| 2010/0220315 | A1* | 9/2010 | Morrell | G01N 15/1436 |
| | | | | 356/73 |
| 2016/0153910 | A1* | 6/2016 | Fuji | G01N 21/6428 |
| | | | | 422/69 |
| 2016/0299060 | A1* | 10/2016 | Hokanson | G01N 15/1468 |
| 2017/0176338 | A1* | 6/2017 | Wu | G02B 21/367 |
| 2019/0076192 | A1* | 3/2019 | Vilokkinen | H01S 3/1305 |
| 2019/0223953 | A1* | 7/2019 | Uusimaa | A61N 5/0616 |
| 2019/0285545 | A1* | 9/2019 | Nagai | G01N 21/13 |
| 2020/0337769 | A1* | 10/2020 | Vilokkinen | A61B 5/0071 |
| 2020/0378830 | A1 | 12/2020 | Gratton et al. | |
| 2021/0255089 | A1* | 8/2021 | Norton | G01N 21/6408 |
| 2022/0276250 | A1* | 9/2022 | Yasuda | G01N 1/36 |
| 2022/0297121 | A1* | 9/2022 | Appleyard | G01N 15/1425 |
| 2023/0040869 | A1* | 2/2023 | Alanko | A61B 18/20 |
| 2023/0041277 | A1* | 2/2023 | Uusimaa | A61N 5/062 |
| 2023/0092749 | A1 | 3/2023 | Cutrale et al. | |
| 2023/0221178 | A1* | 7/2023 | Uusimaa | G01J 3/0208 |
| | | | | 250/205 |
| 2023/0221251 | A1* | 7/2023 | Uusimaa | G01N 21/6428 |
| | | | | 250/459.1 |
| 2024/0058753 | A1* | 2/2024 | Astier | C12Q 1/6806 |
| 2024/0410818 | A1* | 12/2024 | Alsheimer | G02B 21/34 |

OTHER PUBLICATIONS

International Search Report for International Patent Application No. PCT/FI2023/050027, mailed on Apr. 18, 2023, 4 pages.

U.S. Appl. No. 17/970,699, Non-Final Office Action mailed Mar. 20, 2025.

European Application No. 23700312, Office Action mailed Sep. 2, 2025.

* cited by examiner

APPARATUS AND METHOD FOR FLUORESCENCE EXCITATION AND DETECTION

FIELD

The present disclosure relates to fluorescence excitation and detection. In particular, the disclosure relates to sensitive fluorescence excitation and detection method for biological applications.

BACKGROUND

Current fluorescence detection systems, particularly for biological applications, have problems differentiating extremely weak fluorescence signals from background noise. This is particularly a challenge in processes requiring high-speed detection and analysis like gene sequencing, flow cytometry or other sorting of biological samples.

OBJECTIVE

An objective is to alleviate the disadvantages mentioned above.

In particular, it is an objective to facilitate fluorescence excitation and detection with improved sensitivity that is suitable for biological applications.

SUMMARY

According to a first aspect, an apparatus comprises one or more light sources for providing excitation light for fluorescence excitation at an observation spot along an optical axis for excitation. The apparatus may comprise an optical collection element for collecting fluorescence light generated by the excitation light at two or more different observation spots into two or more different measurement channels with an optical axis for collecting nonparallel to the optical axis for excitation of each of the one or more light sources. The fluorescence light originating from different observation spots can thus be collected to different measurement channels. The use of a single optical collection element allows monitoring multiple different observation spots that are close to each other. The optical axis being nonparallel allows preventing the excitation light from the one or more light sources from following the fluorescence light into the two or more measurement channels, thereby increasing the background noise and reducing the signal-to-noise ratio (SNR). The apparatus may also comprise, for each of the two or more measurement channels, an optical detector for detecting fluorescence from the fluorescence light collected by the optical collection element. This allows using a dedicated detector for each of the two or more different observation spots.

In an embodiment, the one or more light sources comprises two or more light sources for providing excitation light for fluorescence excitation, each at a different observation spot and with a different optical axis for excitation. While a single light source may be used for two or more observation spots, for example in combination with a beam splitter element, using multiple light sources allows a dedicated light source to be provided for each of the two or more observation spots, for example with each having a fixed optical axis for excitation. The excitation light can also be directed straight to the observation spots without changing the direction of the excitation light before it reaches the observation spot.

In an embodiment, the apparatus is configured for producing the excitation light at two or more different wavelengths (or peak values thereof). This includes a single light source producing excitation light at only a single wavelength or at multiple different wavelengths, which may include discrete wavelengths and/or a continuous broad spectrum of light, like white light from an LED or a lamp. In the first case, two or more different single-wavelength producing light sources can thus be configured for producing multiple different wavelengths at the same or at different observation spots. These alternatives allow having multiple wavelengths from a single excitation channel or have them separated to two or more excitation channels.

In an embodiment, the apparatus comprises one or more optical excitation elements, such as a beam-shaping element, configured for changing the geometrical shape and/or size of light provided from the one or more light sources to provide the excitation light, such as beams, for fluorescence excitation at an observation spot. The optical excitation element(s) can be positioned between one or more of the one or more light sources and their corresponding observation spot(s). The optical excitation element(s) can be positioned along the corresponding optical axis for excitation. A single optical excitation element may be configured for providing two or more different shapes and/or sizes. Alternatively or additionally, two or more different optical excitation elements may be configured for providing different shape and/or size. The optical excitation element(s) may be configured for the shape and/or size to be fixed or changeable by a user-selection. The use of different shapes and/or sizes increases flexibility of excitation.

In an embodiment, the one or more light sources are configured for producing the excitation light, such as beams, with different pulse length and/or timing at two or more different observation spots. This allows selecting separate time for measuring each observation spot and/or switching between fluorescence and non-fluorescence (like Raman scattering) measurement.

In an embodiment, the apparatus comprises one or more optical excitation elements for generating a dot pattern, such as a dot array or a dot matrix, for splitting the excitation light into two or more beams having their corresponding optical axes for excitation. This allows utilizing a single light source for two or more observation spots, which can be arranged in a pattern, which may be arbitrary or periodical, and/or providing an arbitrary shape of the spot. The shape of the dot pattern may be any shape, periodic or non-periodic, for example a circular shape, a line shape or a star shape. The dot pattern may consist of a continuous pattern (where adjacent dots continuously form a line), a discrete pattern or a combination of one or more continuous patterns and one or more discrete patterns. The dot pattern may be considered as the geometrical shape of the excitation light at the observation spot(s). It may be defined as a two-dimensional shape, which may be substantially perpendicular to the direction of propagation of the excitation light. The optical excitation element(s), such as holographic grating(s), can thus be configured for providing an unique interference pattern. This also applies for an optical beam scanner that can create an arbitrary pattern and can also have arbitrary shape of the spot, for example when combined with a mask and/or holographic grating. In a further embodiment, an optical excitation element of the one or more optical excitation elements is a holographic grating for simultaneous fluorescence emission measurement, for which the apparatus may be configured accordingly. Alternatively or additionally, an optical excitation element of the one or more optical excitation elements is an optical beam scanner for time-separated fluorescence emission measurement, for which the apparatus may be configured accordingly. The measurement may be performed from an arbitrary area and/or pattern on a target plane.

In an embodiment, the optical detectors for the two or more measurement channels consist or comprise one or more of a photomultiplier tube (PMT), a photodiode, a photodiode array or matrix, a charge coupled device (CCD) array or matrix, a spectrometer and a hyperspectral detection element, alone or in any combination.

In an embodiment, the apparatus comprises a separate optical filtering system between the optical collection element and any or all of the optical detectors, each separate optical filtering system together with its corresponding optical detector being configured for measurement of a different wavelength. This allows each of the measurement channels to have a different measurement wavelength.

In an embodiment, the apparatus comprises an optical filtering system between the optical collection element and one or more, even each, of the optical detectors, the optical filtering system comprising a dichroic filter and an absorptive filter. A dichroic filter can be highly sensitive to an angle of incidence of the incident light relative to the surface of said filter, so that it can only effectively filter out light incident at a specific angular range. This angular range may be tailored depending on the application. The dichroic filter may be more sensitive than the absorptive filter in filtering the light. The absorptive filter, on the other hand, can be less sensitive than the dichroic filter, or even non-sensitive, at least to a high degree, to the angle of incidence of the incident light. Here, it is possible to perform majority of filtering using the dichroic filter since the angle of incidence for the fluorescence light to the filter can be fixed for the apparatus. However, utilizing also one or more absorptive filters allows efficient filtering for rays of incident light that are traveling at arbitrary angles, further improving the filtering capability and thus signal-to-noise ratio.

In an embodiment, the apparatus comprises a wavelength selective splitter system, like a grating, a prism or an arrayed waveguide chip, between the optical collection element and any or all of the optical detectors.

In an embodiment, the apparatus is a well plate reader, a microfluidic cell sorting device, a flow cytometry device or a DNA sequencer. In general, the apparatus may be any device configured for measuring fluorescence signal simultaneously from multiple spots on a target, such as a target plane and/or channel.

According to a second aspect, a method comprises providing excitation light for fluorescence excitation at two or more observation spots, each along an optical axis for excitation. The method may also comprise collecting or facilitating collection of fluorescence light generated by the excitation light at the two or more observation spots into two or more measurement channels by a single optical collection element with an optical axis for collection nonparallel to each of the optical axes for excitation. The fluorescence light originating from different observation spots can thus be collected to different measurement channels.

In an embodiment, the method comprises simultaneous measurement from two or more observation spots on a target, such as a target plate. This allows high-speed parallel optical detection and/or sorting of fluorescence-labeled and/or fluorescing samples.

In an embodiment, the excitation light comprises two or more excitation beams separated in time and/or varied by pulse length. This allows for varying measurement cycles between observation spots and/or switching between fluorescence and non-fluorescence emission, like reflection or Raman scattering, measurement for the observation spot(s).

In an embodiment, the method comprises detecting fluorescence from the fluorescence light collected by the optical collection element, for example by the optical detector(s). This may be done for each of the two or more measurement channels, for example separately. The method may also comprise recognizing fluorescence labeled and/or fluorescing biological samples based on the detected fluorescence. The method may comprise forming a sequence of such recognized biological samples as a fluorescence signal sequence and sorting the biological samples for further processing and/or determining the biochemical structure and/or function based on the sequence.

In an embodiment, the method comprises detecting fluorescence from the fluorescence light collected by the optical collection element, for example by the optical detector(s). This may be done for each of the two or more measurement channels, for example separately. The method may also comprise recognizing fluorescing biological samples based on excitation by a short light pulse and time gated detection of the created emission eliminating and/or by diminishing the fluorescence signal against other optical signals, such as Raman scattering. The method may comprise forming a sequence of such recognized biological samples as a non-fluorescence signal sequence and sorting them for further processing and/or determining the biochemical structure or function based on the sequence.

The biomedical samples may comprise of consist of droplets, cells and/or DNA strains. They may be provided, for example, on a sample plate and/or in fluid moving in a channel, such as a microchannel.

It is to be understood that the aspects and embodiments described above may be used in any combination with each other. Several of the aspects and embodiments may be combined together to form a further embodiment of the invention.

BRIEF DESCRIPTION OF THE DRAWINGS

The accompanying drawings, which are included to provide a further understanding and constitute a part of this specification, illustrate examples and together with the description help to explain the principles of the disclosure. In the drawings.

Like references are used to designate equivalent or at least functionally equivalent parts in the accompanying drawings.

DETAILED DESCRIPTION

The detailed description provided below in connection with the appended drawings is intended as a description of examples and is not intended to represent the only forms in which the example may be constructed or utilized. However, the same or equivalent functions and structures may be accomplished by different examples.

Figure 1A:
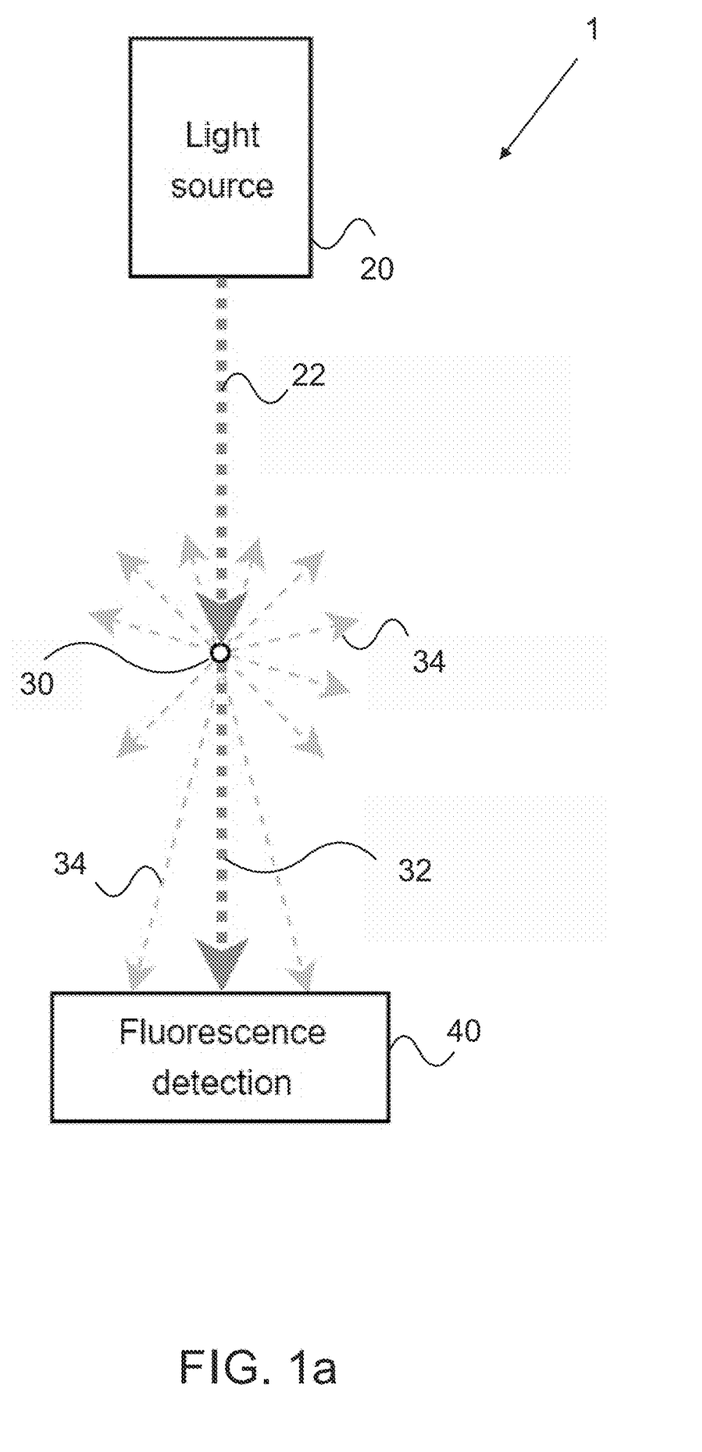
FIG. 1a illustrates a conventional excitation and fluorescence detection light path.

FIG. 1a illustrates a conventional excitation and fluorescence detection light path. A system 1 has a light source 20, from which an excitation beam 22 is propagated at an observation spot 30 to generate fluorescence light 34, and a fluorescence detector 40 for detecting the fluorescence light. Conventionally, the light source is positioned on the same optical axis with the fluorescence detector (and possible detection optics). This is done, for example, when a microfluidics channel or a biological sample is illuminated from one side and fluorescence is detected directly from the other side and allows for a lot of excitation light to be either transmitted or reflected onto the detector. In such configuration, most of the light hitting the detector or fluorescence collection optics can be, in fact, excitation light, producing noise in the detected signal. Filtering this unwanted light in such a conventional manner does not allow differentiating extremely weak fluorescence signals from the background noise. In general, the fluorescence light may be emitted at any direction from the observation spot, as illustrated by the thin arrows originating therefrom. A thick arrow 32, however, illustrates a transmitted excitation beam which, together with some of the fluorescent light, is observed at the detector.

With this approach, it is also not possible to illuminate and measure multiple densely located spots on a sample plate. Commonly, only one observation spot may be used per sample. This limits the speed of measurement in which, e.g., a sorting system can operate, as there is no possibility for making a secondary confirmation measurement or measure multiple locations in parallel. Similarly, when using only one observation spot, it is not possible to calculate the speed of a particle or droplet in a flow system. Finally, while several excitation wavelengths could be introduced with relative ease onto the same observation spot, effectively filtering this greater portion of the electromagnetic spectrum limits the usable detection range. Also, this potentially calls for highly sophisticated filters. Ultimately, the fluorescence produced by a first excitation wavelength could be so similar to a second excitation wavelength, that using such combination in a single observation spot system would not be possible.

Figure 1B:
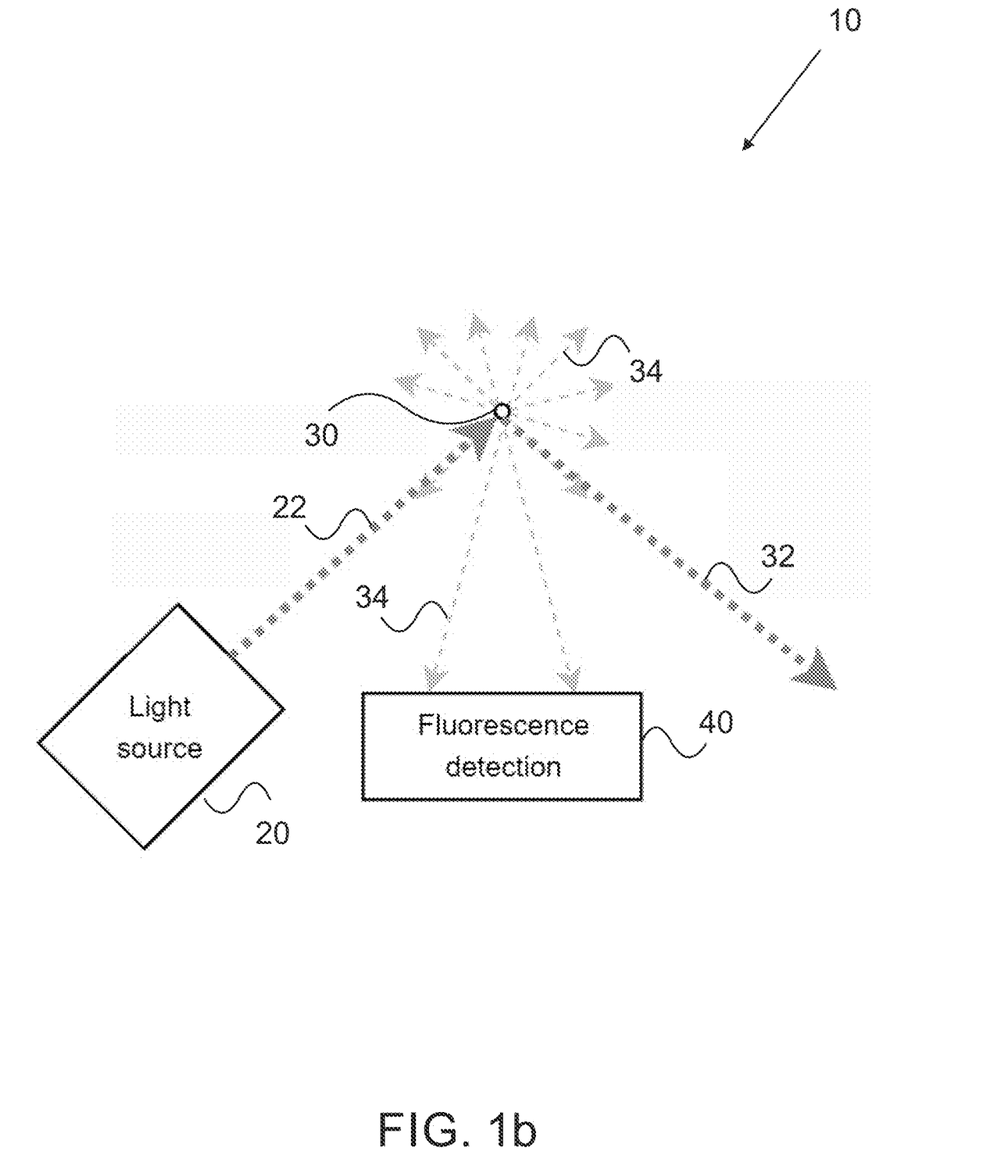
FIG. 1b illustrates an improved excitation and fluorescence detection light path.

FIG. 1b illustrates an improved excitation and fluorescence detection light path in accordance with the present disclosure. An apparatus 10, which can be configured for fluorescence excitation and detection, comprises a light source 20 for providing excitation light for fluorescence excitation at an observation spot 30 along an optical axis 22 for excitation. The excitation light can be produced as one or more excitation beams, for example as pulsed excitation light. The apparatus also comprises an optical detector 40 for detecting fluorescence from fluorescence light 34 generated by the excitation light. Also here, the fluorescence light may be emitted at any direction from the observation spot, as illustrated by the thin arrows originating therefrom. Consequently, it may be detected with the optical detector having an optical axis for detection non-parallel with the optical axis for excitation. Because the aforementioned optical axes are non-parallel, any directly transmitted excitation beam cannot reach the detector. In FIG. 1b, a thick arrow 32 illustrates a reflected excitation beam which also misses the detector. This can be achieved by having an angle between the optical axis for excitation and the optical axis for detection that is larger than a threshold angle of reflection for the excitation light. The threshold angle may be variable depending on the application. The threshold angle can be large enough for the excitation light reflected from the observation spot to miss the optical detector. The light source and the detector (together with any excitation and/or detection optics) can thus be angled in a way that the excitation light has no direct, or even any significant indirect, path to the detector. This allows decreasing the amount of excitation light transmitted and/or reflected to the detector, which in turn can improve SNR.

Figure 2:
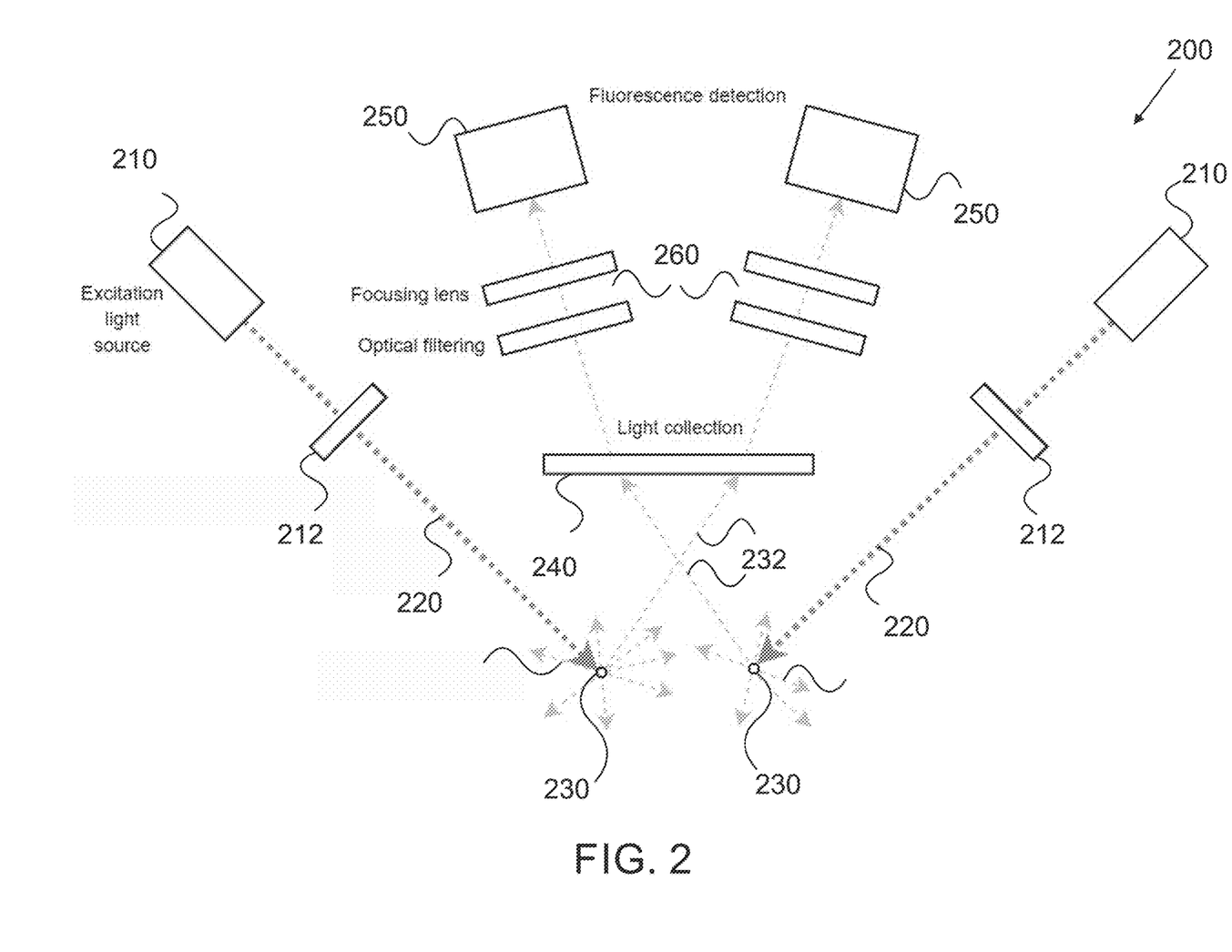
FIG. 2 illustrates an apparatus according to an example.

FIG. 2 illustrates an example of an apparatus 200, which can be configured for fluorescence excitation and detection. Without limitation, it may be or comprise any of a well plate reader, a microfluidic cell sorting device and a DNA sequencer. It may comprise any or all features of the apparatus 10 described with reference to FIG. 1b. In conjunction with the angled detection, this apparatus 200 comprises a single optical collection element 240 configured for collecting light from two different observation spots 230. Due do the optical design, the light paths from the two different observation spots are not mixed.

The apparatus 200 may thus comprise one or more light sources 210. Each of these may be configured for providing excitation light for fluorescence excitation at an observation spot 230 along an optical axis for excitation 220. The excitation light can be produced as one or more excitation beams, for example as pulsed excitation light. The excitation light follows the optical axis for excitation, for each of the optical axes, which may be aligned directly from the corresponding light source to its respective observation spot. While the path of the excitation light may also be changed before the observation spot, the optical axis for excitation may here refer to the light path for the excitation light when it reaches the observation spot. The observation spot may be a point-like target for the excitation light. The apparatus may be arranged for fluorescence excitation and detection for a sample flowing through the observation spots. For this purpose, the sample may be arranged to flow at a flow channel, such as a microfluidics channel, which may be part of the apparatus or separate from it. However, the apparatus may also be arranged for measurement of stationary samples, for example by comprising a sample chamber for such purpose. The light source(s) may be collimated light source(s) and/or a pulsed light source(s). With one or more pulsed light sources, the apparatus may be configured for time-separated fluorescence excitation and detection. The light source(s) may comprise or consist of, for example, any of a laser source, an LED source and a broadband source, such as a lamp. The laser source(s) may consist of (a) fixed-wavelength or (a) wavelength-tunable laser source(s), or a combination thereof. The laser source(s) may comprise or consist of (a) diode laser(s), for example. The apparatus, or any or all of the one or more light sources thereof, may be configured for producing the excitation light at two or more different wave lengths, which may refer to the peak values thereof. The apparatus may be configured for the excitation light corresponding to different wavelengths to be produced by a single light source and/or by two different light sources, each configured for, fixedly or tunably, producing a excitation light at a different wavelength. The apparatus, or any or all of the one or more light sources thereof, may be configured for producing the excitation light with different pulse length and/or timing at two or more different observation spots. The apparatus may be configured for this excitation light corresponding to different pulse length and/or timing to be produced by a single light source and/or by two different light sources, each configured for producing excitation light at a different pulse length and/or timing.

Importantly, the apparatus 200 may be configured for excitation and detection of fluorescence at two different (meaning spatially different) observation spots, for example at a microfluidics channel. For this purpose, the one or more light sources 210 may comprise two or more light sources, as illustrated in FIG. 2. These may be configured for having a different optical axis for excitation 220 with respect to each other, each directed at a different observation spot 230. The optical axis of a light source may be fixed or changeable (by translation and/or rotation) for any or all of the one or more light sources.

It is noted that a single light source may also be used for fluorescence excitation at two or more observation spots. For this purpose, the apparatus may comprise one or more optical excitation elements for splitting the excitation light, such as beams, into two or more beams having their corresponding optical axes for excitation. This may involve generating a dot pattern, such as a dot array or a dot matrix, where each dot may be assigned to a separate observation spot. The apparatus may be configured for simultaneous fluorescence emission measurement, and for this purpose the optical excitation element may be a holographic grating. Alternatively or additionally, the apparatus may be configured for time-separated fluorescence emission measurement, and for this purpose the optical excitation element may be an optical beam scanner. The apparatus may also comprise one or more optical excitation elements configured for producing excitation light, such as beams, with two or more different geometrical shapes and/or sizes along any or all of the optical axes of excitation. The geometrical shapes may include any of a line, a circle, a rectangle and a sphere, for example. The apparatus may be configured for any or all of the aforementioned optical excitation elements to be positioned between one or more, even each, of the one or more light sources. Alternatively or additionally, an optical excitation element, as described herein, may also be integrated to one or more, even each, of the one or more light sources.

Transmission of the excitation light to any or all of the observation spots may be facilitated by one or more optical fibers. The excitation light may also be filtered, for example in such a way that any possible trace amounts of wavelengths corresponding to a wavelength of the fluorescence light present in the excitation light are blocked. The excitation light can then be collimated and/or focused, for example by using lenses. In general, the apparatus 200 may comprise an optical system 212 for excitation between any or all of the observation spots 230 and the corresponding light source 210 for providing the excitation light to the observation spot. The optical system may also be part of the light source, for example integrated thereto, or separate therefrom. The optical systems for any or all different observation spots may be separate from each other. The optical system may comprise any of collimation, filtering and focusing optics for the excitation light. In particular, it may comprise one or more filters for filtering out one or more wavelengths of the excitation light corresponding to one or more wavelengths of the fluorescence light. The separate illumination/excitation optics and collection/detection optics, as disclosed herein, allows having a different shape for excitation in comparison to the measurement area where the signal is collected. This allows using any of narrow lines, multiple lines or even multiple spots in the measurement area for the excitation light. This allows providing further functionalities in measurement, e.g., by measuring movement of a droplet on a microchannel with well-defined distance for speed or movement progress analysis.

The apparatus 200 may comprise an optical collection element 240, such as a lens. The optical collection element may be configured for collecting fluorescence light 232 generated by the excitation light at two or more different observation spots into two or more different measurement channels with an optical axis for collecting non-parallel to the optical axis for excitation 220 of each of the one or more light sources 210. As illustrated above, with reference to FIG. 1b, this can be used to prevent any directly transmitted excitation light from being collected by the optical collection element. Moreover, the apparatus may be configured for having an angle between any or all of the optical axes for excitation and the optical axis for collecting that is larger than a threshold angle of reflection for the excitation light. The threshold angle may again be variable depending on the application. The threshold angle can be large enough for the excitation light reflected from any or all of the observation spots to miss the optical collection element for collecting the reflected excitation light. The optical axis or axes for excitation and the optical collection element can thus be angled in a way that the excitation light has no direct, or even any significant indirect, path for being collected by the optical collection element. This allows decreasing the amount of excitation light transmitted and/or reflected to the detector, which in turn can improve SNR.

The optical collection element 240 allows collecting fluorescence light 232 from the two or more different observation spots 230 into different measurement channels. The fluorescence light from the two or more observation spots is thereby collected through at least one common optical element. The apparatus 200 may comprise two or more optical detectors 250, at least one for each of the measurement channels. An optical detector as referred herein may be a photomultiplier tube (PMT), a photodiode, a photodiode array or matrix, a charge coupled device (CCD) array or matrix, a spectrometer or a hyperspectral detection element. The optical detector can thus be a discrete semiconductor element such as a photodiode, an array of such components, a camera sensor or any other element capable of transforming optical signal into an electrical signal. The optical detector can also comprise or consist of a spectrally resolving sensor, like a spectrometer or a hyperspectral imaging device, which may be configured for collecting the full spectral information of the fluorescence light. An example may involve very short pulse excitation light detected by a very fast detector or imaging chip allowing time-resolved fluorescence measurement. This may be further used for collecting fluorescence-free Raman signals, for example from from biological samples. This allows analyzing fluorescence label-free samples, such as biological samples.

One or more of these types may be used for the one or more optical detectors. The optical detectors may be configured for detecting fluorescence from the fluorescence light collected by the optical collection element into the corresponding measurement channel. This optical configuration allows separating measurements from different observation spots into their own measurement channels with their own optical detectors, even when the observation spots are close to each other. In conjunction with the angled excitation and detection geometry, this allows markedly reducing background noise for each observation spot.

Simultaneous multiple observation spots per sample allow time-dependent detection of moving particles or droplets, and the apparatus may be configured accordingly. Several excitation wavelengths can also be used for providing qualitative information about the sample. On the other hand, multi-wavelength narrow line (laser or filtered broadband source) one-spot illumination allows high-speed parallel or serial sample analysis with multiple fluorescence signals or labels. The apparatus 200 can thus be configured for parallel and/or serial sample analysis at the two or more observation spots.

The apparatus 200 may comprise an optical system 260 for detection between the optical collection element 240 and one or more, even each, of the optical detectors 250. The optical system for any or all of the optical detectors may be separate from the others. Correspondingly, each of the two or more measurement channels may have its own, separate optical system. Importantly, the optical system(s) 212 for excitation can, in the present solution, be separate from the optical system(s) 260 for detection. This allows improved adaptability in various ways, for example allowing different shapes excitation light, in comparison to the of the light to be detected. Any or all of the optical systems for detection may comprise one or more optical elements such as focusing lenses. These may be configured for optically preparing, for example focusing, the fluorescence light collected by the optical collection element 240 for the corresponding optical detector. Any or all of the optical systems may comprise a wavelength selective splitter system, such as a grating, a prism or an arrayed waveguide chip.

Any or all of the optical systems 260 may comprise an optical filtering system, which may comprise one or more optical filters. The optical filtering system, together with its corresponding optical detector, may be configured so that two or more, even each, of the two or more measurement channels are configured for measurement of different wavelength. Alternatively or additionally, any or all of the optical filtering systems may comprise or consist of a dichroic filter and an absorptive filter. The absorptive filter may be configured for filtering at a wider wavelength range in comparison to the dichroic filter. The dichroic filter may be configured for higher maximal sensitivity in comparison to the absorptive filter. The dichroic filter may refer to a thin-film filter.

As an example of the solution, fluorescence light 232 can be produced at an illuminated area, which corresponds to an observation spot 230. Measurement can be collected from one or more observation spots using a single optical collection element 240, such as an optical collection lens, but separate signal channels, i.e. measurement channels, for each observation spot. One or more optical filters can then be used to remove any present excitation light at any or all of the measurement channels. This filtering can be tailored to be different for any combination or all of the measurement channels. Finally, the light can be focused onto an optical detector, where an electrical fluorescence signal can be generated.

Figure 3:
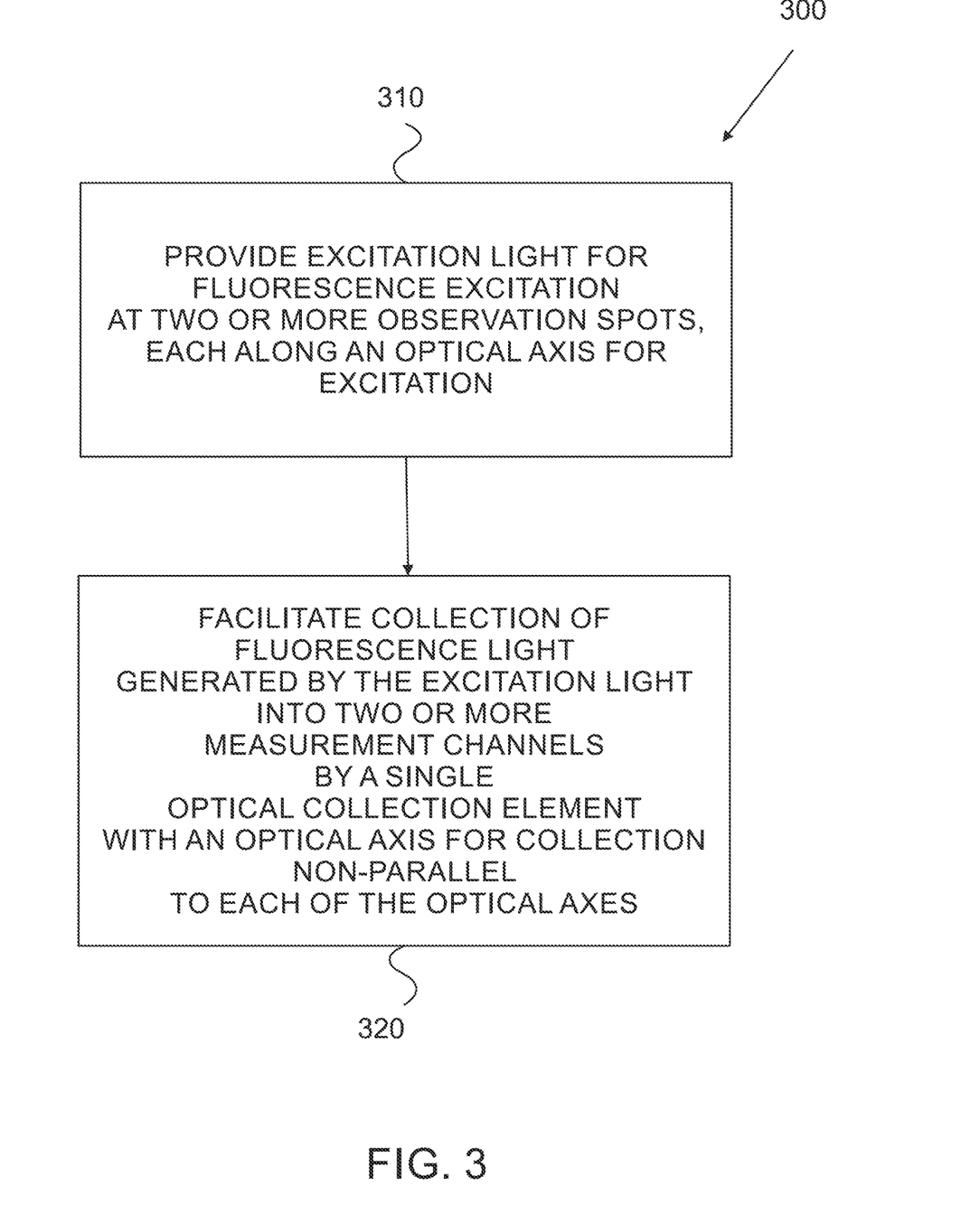
FIG. 3 illustrates a method according to an example.

FIG. 3 shows an example of a method 300, which may be used for fluorescence excitation and detection. The method comprises several parts which may be performed repeatedly and/or continuously. Any features described in conjunction of the method may be applied in conjunction of any of the apparatuses as described above and vice versa.

The method 300 may comprise providing 310 excitation light for fluorescence excitation at two or more observation spots, each along an optical axis for excitation, for example by the one or more light sources as described above. It may also comprise collecting or facilitating collection 320 of fluorescence light generated by the excitation light at the two or more observation spots into two or more measurement channels by a single optical collection element with an optical axis for collection non-parallel to each of the optical axes for excitation. The collection may be performed using an optical collection element as described above. Fluorescence from the fluorescence light collected by the optical collection element can then be detected at each of the two or more measurement channels separately, for example by an optical detector as described in conjunction of the apparatuses above. Various filtering and/or other actions may be performed to the excitation light and/or the fluorescence light, for example as described above in conjunction of the apparatuses.

The solutions disclosed herein may be applied in systems that produce excitation light, which when hitting a sample, produces fluorescence light in a wavelength different from that of the excitation light. This fluorescence light can, in turn, be detected. Possible application fields include biophotonics and microfluidics, specifically in application areas dealing with very low fluorescence signal level like cell or droplet sorting, label reading in sequencing and so on.

The solutions allow improvement of the produced fluorescence signal strength and improved distinction from background noise. Multiple observation spots per sample, which can be observed simultaneously, along the sample path enable speed calculation of particles and/or droplets of the sample. This can be utilized, for example, in flow cytometry applications, where fluorescence-labelled entities are separated from non-fluorescent ones. Furthermore, several adjacent observation spots allow multiple lanes to be processed simultaneously.

Additionally, several excitation and detection wavelengths can be used and detected independently of each other, and multiple high density observations spots, which may act as measurement points, enables high-speed parallel fluorescence label reading, e.g., in high-speed gene sequencing.

The solutions, including any of the apparatuses 10, 200, can be implemented in a compact form-factor. This enables close proximity of observation spots, and thus allows for the samples, which may be single-used samples, to be smaller than conventionally used ones. The compactness of the solutions allows their integration into devices that can be used for large-scale testing, but could still be easily transportable.

The solutions allow excitation light to an observation spot simultaneously with detection of the fluorescence light at the observation spot, and any of the apparatuses disclosed herein may be configured accordingly. This allows improvement over time-gate excitation and collection, where no excitation light is provided during fluorescence collection, or over the simple use of emission filters that block excitation light. With the solution, there is no need to rely on emission filters at angles that don't block excitation light adequately. Fluorescence can be detected from a side, with respect to the excitation, for example orthogonal to excitation light.

The different functions discussed herein may be performed in a different order and/or concurrently with each other.

Any range or device value given herein may be extended or altered without losing the effect sought, unless indicated otherwise. Also any example may be combined with another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

Numerical descriptors such as 'first', 'second', and the like are used in this text simply as a way of differentiating between parts that otherwise have similar names. The numerical descriptors are not to be construed as indicating any particular order, such as an order of preference, manufacture, or occurrence in any particular structure.

Expressions such as 'plurality' are in this text to indicate that the entities referred thereby are in plural, i.e. the number of the entities is two or more.

Although the invention has been the described in conjunction with a certain type of apparatus and/or method, it should be understood that the invention is not limited to any certain type of apparatus and/or method. While the present inventions have been described in connection with a number of examples, embodiments and implementations, the present inventions are not so limited, but rather cover various modifications, and equivalent arrangements, which fall within the purview of the claims. Although various examples have been described above with a certain degree of particularity, or with reference to one or more individual embodiments, those skilled in the art could make numerous alterations to the disclosed examples without departing from the scope of this specification.

The invention claimed is:

1. An apparatus comprising:
   one or more light sources for providing excitation light for fluorescence excitation at an observation spot along an optical axis for excitation, wherein the optical axis for excitation is a light path for the excitation light when it reaches the observation spot;
   an optical collection element for collecting fluorescence light generated by the excitation light at two or more different observation spots into two or more different measurement channels with an optical axis for collecting non-parallel to the optical axis for excitation of each of the one or more light sources, wherein the fluorescence light generated at different observation spots is collected to different measurement channels by the optical collection element; and
   two or more optical detectors, at least one for each of the two or more measurement channels, for detecting fluorescence from the fluorescence light collected by the optical collection element, wherein the two or more optical detectors are not along the optical axis for excitation.

2. The apparatus according to claim 1, wherein the one or more light sources comprises two or more light sources for providing excitation light for fluorescence excitation, each at a different observation spot and with a different optical axis for excitation.

3. The apparatus according to claim 1, configured for producing the excitation light at two or more different wavelengths.

4. The apparatus according to claim 1, comprising one or more optical excitation elements configured for changing the geometrical shape and/or size of light provided from the one or more light sources to provide the excitation light for fluorescence excitation at an observation spot.

5. The apparatus according to claim 1, wherein the one or more light sources are configured for producing the excitation light with different pulse length and/or timing at two or more different observation spots.

6. The apparatus according to claim 1, comprising an optical excitation element for generating a dot pattern for splitting the excitation light into two or more beams having their corresponding optical axes for excitation.

7. The apparatus according to claim 6, wherein the optical excitation element is a holographic grating for simultaneous fluorescence emission measurement.

8. The apparatus according to claim 6, wherein the optical excitation element is an optical beam scanner for time-separated fluorescence emission measurement.

9. The apparatus according to claim 1, wherein the optical detectors for the two or more measurement channels comprise any of a photomultiplier tube (PMT), a photodiode, a photodiode array or matrix, a charge coupled device (CCD) array or matrix, a spectrometer and a hyper spectral detection element.

10. The apparatus according to claim 1, comprising a separate optical filtering system between the optical collection element and any or all of the optical detectors, each separate optical filtering system together with its corresponding optical detector being configured for measurement of different wavelength.

11. The apparatus according to claim 1, comprising an optical filtering system between the optical collection element and any or all of the optical detectors, the optical filtering system comprising a dichroic filter and an absorptive filter.

12. The apparatus according to claim 1, comprising a wavelength selective splitter system between the optical collection element and any or all of the optical detectors.

13. The apparatus according to claim 1, wherein the apparatus is a well plate reader, a microfluidic cell sorting device, a fluorescence flow cytometry device or a DNA sequencer.

14. A method comprising:
   providing excitation light for fluorescence excitation at two or more observation spots, each along an optical axis for excitation, wherein the optical axis for excitation is a light path for the excitation light when it reaches the observation spot; and
   facilitating collection of fluorescence light generated by the excitation light at the two or more observation spots into two or more measurement channels by a single optical collection element with an optical axis for collection non-parallel to each of the optical axes for excitation, wherein the fluorescence light generated at different observation spots is collected to different measurement channels by the optical collection element; and
   detecting, at two or more optical detectors, at least one for each of the two or more measurement channels, fluorescence from the fluorescence light collected by the optical collection element, wherein the two or more optical detectors are not along the optical axis for excitation.

15. A method according to claim 14 comprising:
   detecting fluorescence from the fluorescence light collected by the optical collection element;
   recognizing fluorescence labeled and/or fluorescing biological samples based on the detected fluorescence; and forming a sequence of such recognized bio logical samples as a fluorescence signal sequence and sorting the biological samples for further processing and/or determining the biochemical structure and/or function based on the sequence.

16. A method according to claim 14 comprising:

detecting fluorescence from the fluorescence light collected by the optical collection element;

recognizing fluorescing biological samples based on excitation by a short light pulse and time gated detection of the created emission eliminating and/or by diminishing the fluorescence signal against other optical signals; and forming a sequence of such recognized biological samples as a non-fluorescence signal sequence and sorting them for further processing and/or determining the biochemical structure or function based on the sequence.

* * * * *